(12) United States Patent
Lauture (10) Patent No.: US 11,860,284 B2
(45) Date of Patent: Jan. 2, 2024

(54) MULTICONFIGURABLE GLOBAL NAVIGATION SATELLITE SYSTEM RECEIVER AND HANDHELD RECEPTACLE

(71) Applicant: Eos Positioning Systems Inc., Terrebonne (CA)

(72) Inventor: Jean-Yves Lauture, Terrebonne (CA)

(73) Assignee: EOS POSITIONING SYSTEMS INC., Terrebonne (CA)

( * ) Notice: Subject to any disclaimer, the term of this patent is extended or adjusted under 35 U.S.C. 154(b) by 0 days.

(21) Appl. No.: 18/125,362

(22) Filed: Mar. 23, 2023

(65) Prior Publication Data
US 2023/0305169 A1    Sep. 28, 2023

Related U.S. Application Data

(60) Provisional application No. 63/322,720, filed on Mar. 23, 2022, provisional application No. 63/322,724, filed on Mar. 23, 2022.

(51) Int. Cl.
*H04M 1/02* (2006.01)
*H04B 1/08* (2006.01)
*G01S 19/37* (2010.01)
*H01M 50/00* (2021.01)

(52) U.S. Cl.
CPC ............. *G01S 19/37* (2013.01); *H01M 50/00* (2021.01); *H04B 1/088* (2013.01)

(58) Field of Classification Search
CPC ........ G01S 19/37; H01M 50/00; H04B 1/088; H04B 1/03; H04B 1/08; H04B 1/3883; H04M 1/0262; H04M 1/02; H04M 1/03
See application file for complete search history.

(56) References Cited

U.S. PATENT DOCUMENTS

| 8,125,376 B1 * | 2/2012 | Ashjaee | G01S 19/47 |
| | | | 342/357.34 |
| 8,409,742 B2 * | 4/2013 | Zhang | H01M 50/209 |
| | | | 429/100 |
| 2008/0214248 A1 * | 9/2008 | Hensel | H04M 1/0254 |
| | | | 455/572 |

(Continued)

FOREIGN PATENT DOCUMENTS

CN    113514865    10/2021

*Primary Examiner* — Andrew Wendell
(74) *Attorney, Agent, or Firm* — Benoit&Cote Inc.; Charles-Andre Caron (57) ABSTRACT

A system having a global navigation satellite system (GNSS) receiver having a GNSS receiver battery receptacle for housing a battery therein, and a handheld receptacle which has an insertion portion which is shaped as an outer portion of the battery and which is adapted for insertion into the battery receptacle of the GNSS receiver instead of the battery, wherein the handheld receptacle has a handheld receptacle battery receptacle to receive the battery therein. The battery can be swapped from the GNSS receiver and the handheld receptacle. A socket can be provided on the handheld receptacle for mounting a computing device thereon in communication with the GNSS receiver. A pole-mount adapter can be used for connecting the GNSS receiver onto a pole below the GNSS battery receptacle and can be mounted and dismounted even when the handheld receptacle is inserted in the GNSS receiver.

16 Claims, 12 Drawing Sheets

(56) References Cited

U.S. PATENT DOCUMENTS

| | | | |
|---|---|---|---|
| 2009/0024325 A1* | 1/2009 | Scherzinger | G01C 21/12 |
| | | | 701/469 |
| 2011/0191058 A1* | 8/2011 | Nielsen | G01C 15/02 |
| | | | 702/141 |
| 2012/0218146 A1* | 8/2012 | Leclercq | G01S 19/34 |
| | | | 342/357.74 |
| 2012/0302348 A1 | 11/2012 | Karacal et al. | |
| 2016/0259061 A1* | 9/2016 | Carter | G01S 19/28 |

* cited by examiner

MULTICONFIGURABLE GLOBAL NAVIGATION SATELLITE SYSTEM RECEIVER AND HANDHELD RECEPTACLE

CROSS-REFERENCE TO RELATED APPLICATIONS

This application claims priority or benefit from U.S. provisional patent application 63/322,720, filed Mar. 23, 2022, and U.S. provisional patent application 63/322,724, filed Mar. 23, 2022, the specification of which are hereby incorporated herein by reference in their entirety.

TECHNICAL FIELD

The present disclosure relates to global navigation satellite system (GNSS) systems, such global positioning systems (GPS). More specifically, it relates to GNSS receivers such as handheld GNSS receivers, pole-mounted GNSS receivers and the like.

BACKGROUND

Devices with global navigation satellite system (GNSS) can determine geolocation information. GNSS systems can include, without limitation, United States' Global Positioning System (GPS), Russia's Global Navigation Satellite System (GLONASS), China's BeiDou Navigation Satellite System, the European Union's Galileo, Japan's Quasi-Zenith Satellite System (QZSS), or the Indian Regional Navigation Satellite System (IRNSS). While GNSS receivers can be embedded in various electronic devices such as smartphones, the present disclosure relates mainly to professional or dedicated GNSS receivers for which use cases may include land surveying, civil engineering, mapping, topographic measurements, forestry, road building, wildland exploration, etc. Such GNSS receivers typically have a very high precision and are adapted to a professional use (engineering, geography, etc.) or to a dedicated use (e.g., dedicated GNSS receiver used when trekking, mountain climbing or hiking in remote areas).

These GNSS receivers are normally provided as handheld devices, pole-mounted devices or attachable devices to be attached on personal equipment such as on a backpack. They are used for specific GNSS measurements that can be read either directly thereon or via an electronic device which is paired thereto.

SUMMARY

According to a first aspect of the disclosure, there is provided a system having:
- a global navigation satellite system (GNSS) receiver having a GNSS receiver battery receptacle for housing a battery therein; and
- a handheld receptacle which has an insertion portion which is shaped as an outer portion of the battery and which is adapted for insertion into the battery receptacle of the GNSS receiver instead of the battery, wherein the handheld receptacle has a handheld receptacle battery receptacle to receive the battery therein.

According to an embodiment, the handheld receptacle further has a socket for installing and securing an associated computing device thereon, the computing device being in communication with the GNSS receiver.

According to an embodiment, the socket is removably attached to the handheld receptacle.

According to an embodiment, the socket is centrally located between the insertion portion and handheld receptacle battery receptacle such that a weight of the computing device is applied centrally on said handheld receptacle.

According to an embodiment, the handheld receptacle has an electric circuit therein to provide power from the battery installed in the handheld receptacle battery receptacle to the GNSS receiver battery receptacle through the insertion portion of the handheld receptacle.

According to an embodiment, there is further provided a pole-mount adapter for connecting the GNSS receptacle onto a pole 150, wherein the pole-mount adapter is immediately below the GNSS receiver battery receptacle and the battery and the insertion portion of the handheld receptacle can be interchanged from the GNSS receiver while leaving the pole-mount adapter in place.

According to an embodiment, the GNSS receiver battery receptacle has a first rail and the insertion portion of the handheld receptacle comprises a first linear recess corresponding to the first rail for slidably receiving the insertion portion of the handheld receptacle in the GNSS receiver battery receptacle.

According to an embodiment, the handheld receptacle battery receptacle has a second rail and the battery comprises a second linear recess corresponding to the second rail for slidably receiving the battery in the handheld receptacle battery receptacle.

According to an embodiment, the second rail of the handheld receptacle battery receptacle is identical to the first rail of the GNSS receiver battery receptacle, and the second linear recess of the battery corresponds to both the first rail and the second rail for alternately slidably receiving the battery in the handheld receptacle battery receptacle or in the GNSS receiver battery receptacle.

According to an embodiment, the GNSS receiver battery receptacle has a first linear recess and the insertion portion of the handheld receptacle comprises a first rail corresponding to the first linear recess for slidably receiving the insertion portion of the handheld receptacle in the GNSS receiver battery receptacle.

According to an embodiment, the handheld receptacle battery receptacle has a second linear recess and the battery comprises a second rail corresponding to the second linear recess for slidably receiving the battery in the handheld receptacle battery receptacle.

According to an embodiment, the second linear recess of the handheld receptacle battery receptacle is identical to the first linear recess of the GNSS receiver battery receptacle, and the second rail of the battery corresponds to both the first linear recess and the second linear recess for alternately slidably receiving the battery in the handheld receptacle battery receptacle or in the GNSS receiver battery receptacle.

According to an embodiment, there is further provided a retaining pin in the GNSS receiver battery receptacle that retains either the battery or the insertion portion of the handheld receptacle in place in the GNSS receiver battery receptacle.

According to an embodiment, there is further provided a retaining pin in the handheld receptacle battery receptacle that retains the battery in place in the handheld receptacle battery receptacle.

According to an embodiment, the GNSS receiver is a Global Positioning System (GPS) receiver.

BRIEF DESCRIPTION OF THE DRAWINGS

Further features and advantages of the present disclosure will become apparent from the following detailed description, taken in combination with the appended drawings, in which.

It will be noted that throughout the appended drawings, like features are identified by like reference numerals.

DETAILED DESCRIPTION

Various aspects of the present disclosure generally address one or more of the problems of using a dedicated GNSS receiver in a user-friendly manner.

The present description provides a handle, or handheld receptacle, to be used in combination with a GNSS receiver, wherein the GNSS receiver requires a battery to be operable. Typically, the battery is housed in the GNSS receiver; however, according to the present disclosure, the handheld receptacle can advantageously be inserted in a battery housing of the GNSS receiver to secure them together, and the battery is instead displaced in the handheld receptacle.

Indeed, the battery is mechanically swappable between inside the handheld receptacle and inside the GNSS receiver depending on whether the handheld receptacle is combined or not to the GNSS receiver. The handheld receptacle is insertable into the battery housing of the GNSS receiver. This insertability is made possible by shaping a portion of the handheld receptacle to be complementary with the inside of the battery housing of the GNSS receiver; in other words, said portion of the handheld receptacle is shaped in part as the battery which is otherwise housed in the GNSS receiver. This permits the use of the handle to be secured to the GNSS receiver in a convenient and solid manner when they are used in combination. An electric connection can also be provided such that the battery, originally housed in the GNSS receiver and displaced into a battery housing of the handheld receptacle instead, can provide electrical power to the GNSS receiver through the handheld receptacle via an electrical connection of the handheld receptacle in the battery housing of the GNSS receiver to keep powering the GNSS receiver.

A global navigation satellite system (GNSS receiver) according to the present disclosure, encompasses, without limitation, any one of or more than one of: Global Positioning System (GPS), Galileo, GLONASS, China's BeiDou Navigation Satellite System, QZSS, IRNSS, or any other system which is considered as a fully operational global navigation satellite system.

Referring now to the drawings, FIGS. 1A-1G illustrate a GNSS receiver 100 in accordance with the embodiments of the present disclosure. According to an embodiment, the GNSS receiver 100 comprises a housing 101 (or body) and an antenna 102. The GNSS receiver 100 also comprises electronic components, such as a micro-controller 105 and suitable transceivers, for example and without limitation, a Bluetooth™ transceiver 108 for sending and receiving data from nearby devices, including electronic devices 110 such as a smartphone, a tablet, a laptop computer, and the like.

According to an embodiment, and as shown in FIGS. 1A-1G and FIGS. 2A-2G, the GNSS receiver 100 comprises all components in the housing 101, including the antenna 102 and the electronic components 104 (such as the micro-controller 105, Bluetooth™ transceiver 108, etc.). According to the embodiment as shown in FIGS. 1A-1G, the antenna is a single-band antenna. According to the embodiment as shown in FIGS. 2A-2G, the antenna is a multi-band antenna, which is thicker than the single-band antenna and therefore requires a higher housing 101 to accommodate this thicker antenna.

Figure 1A:
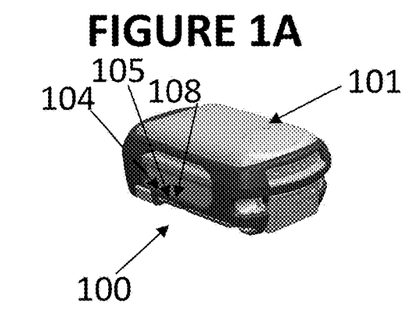
FIGS. 1A-1H depict a GNSS receiver comprising a single-band antenna and a housing, in accordance with the embodiments of the present disclosure.
Figure 1B:
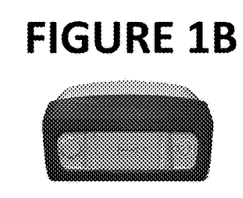
Figures 1C, 1D:
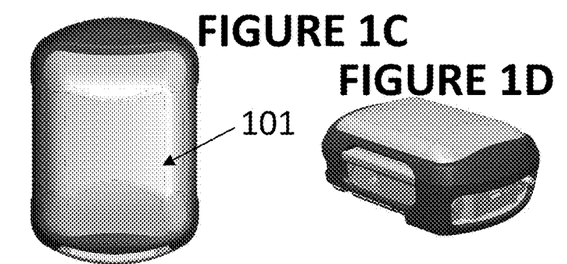
Figure 1E:
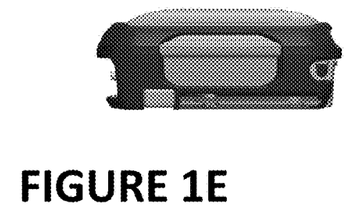
Figure 1F:
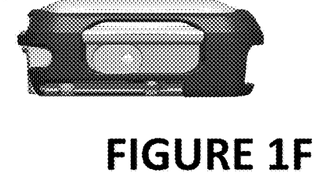
Figure 1G:
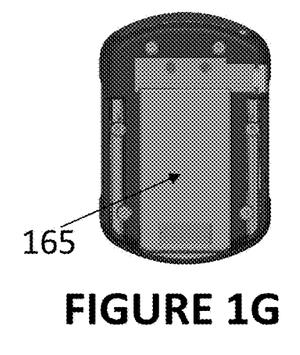
Figure 1H:
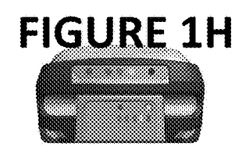
Figures 2A, 2B, 2C, 2D, 2E, 2F, 2G, 2H:
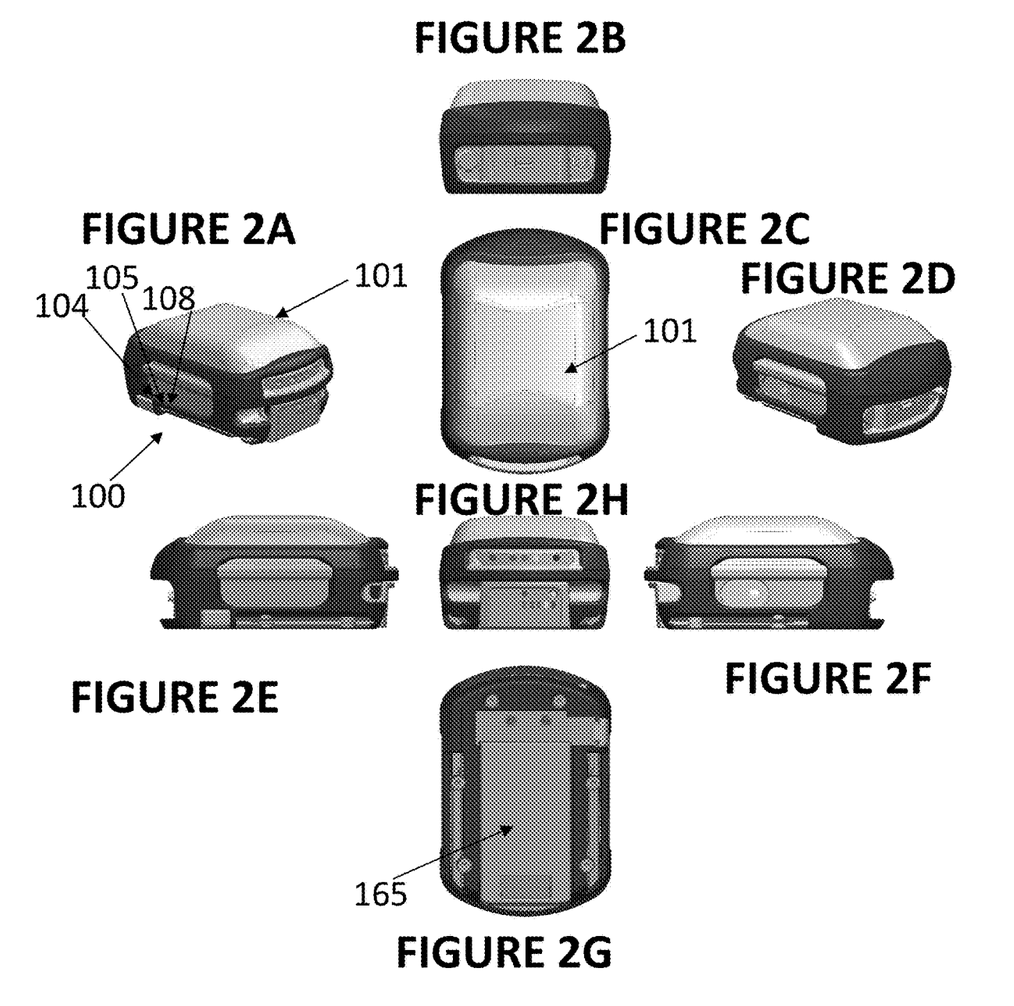
FIGS. 2A-2H depict a GNSS receiver comprising a multi-band antenna and a housing, in accordance with the embodiments of the present disclosure.
Figure 3A:
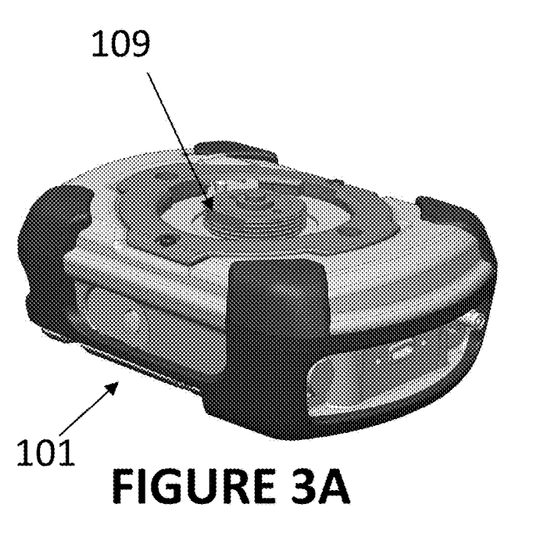
FIGS. 3A-3C depict a GNSS receiver comprising a removable antenna, in accordance with the embodiments of the present disclosure.
Figure 3B:
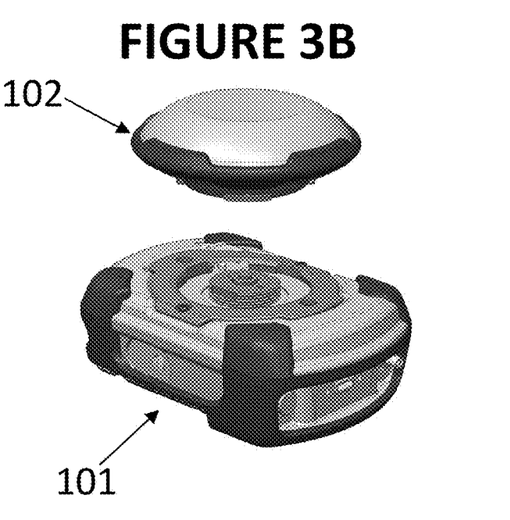
Figure 3C:
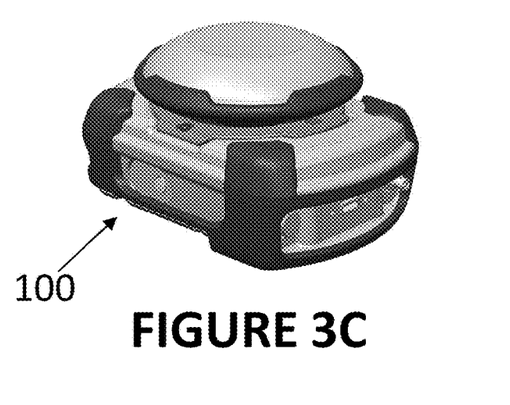

According to another embodiment, and as shown in FIGS. 3A-3C, the antenna 102 can be separate and distinct from the remaining parts of the GNSS receiver 100 inside of being housed therein. According to this embodiment, the antenna 102 is therefore releasably securable onto the housing 101. Accordingly, in this embodiment, the housing 101 and/or the antenna 102 comprise an attachment 109 for mechanically coupling them together, such as a screw on one element and a corresponding thread on the other element for screwing them together. Other attachments are possible, such as, without limitation, a snap connector, a pin and a bore, a clip, holding arms, corresponding protrusion and recess which can lock together, a pair of magnets or electromagnets, an adhesive or sticker, a zipper, buttons, etc. This embodiment is useful for cases in which the antenna 102 needs to be interchanged or needs to be attached to something else, such as a backpack or other pieces of equipment. For example, the attachment 109 may a screw-type of protrusion which is provided in the housing 101, and the antenna 102 has a bottom inner threaded bore with corresponding diameter and pitch to match with the screw-type of protrusion and be screwed onto the housing 101 as shown in FIGS. 3A-3C.

Moreover, the housing 101 may comprise all ports and other types of connectors which are necessary or advantageous to have on the external surface thereof to be able to input and output data therethrough, and they should be in connection with the appropriate electronic components 104 therein.

According to an embodiment, padding such as padding made of a resilient material (silicone and the like) can be used to mechanically protect the external surface of the GNSS receiver 100.

Figure 4A:
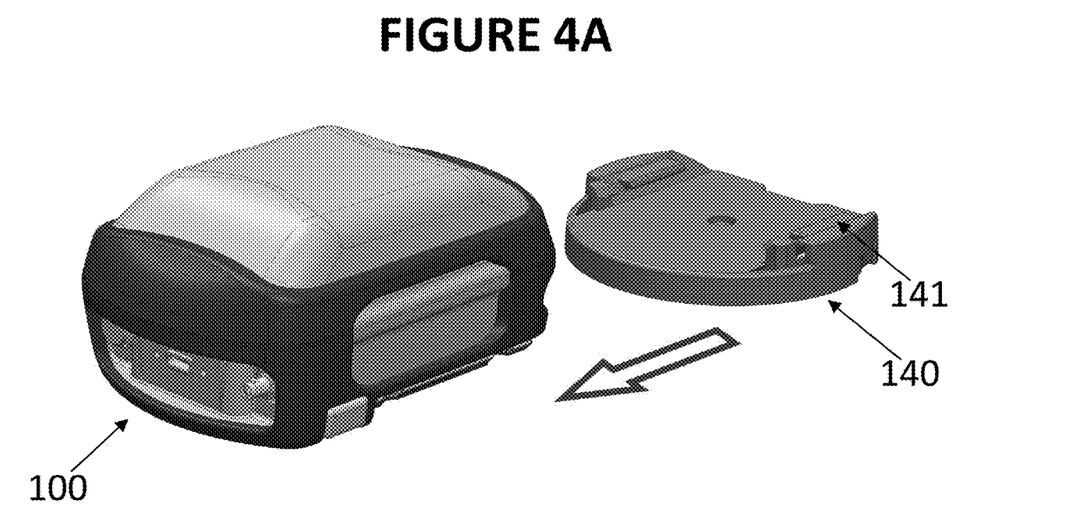
FIGS. 4A-4B depict a GNSS receiver and a pole-mount adapter therefor, in accordance with the embodiments of the present disclosure.
Figure 4B:
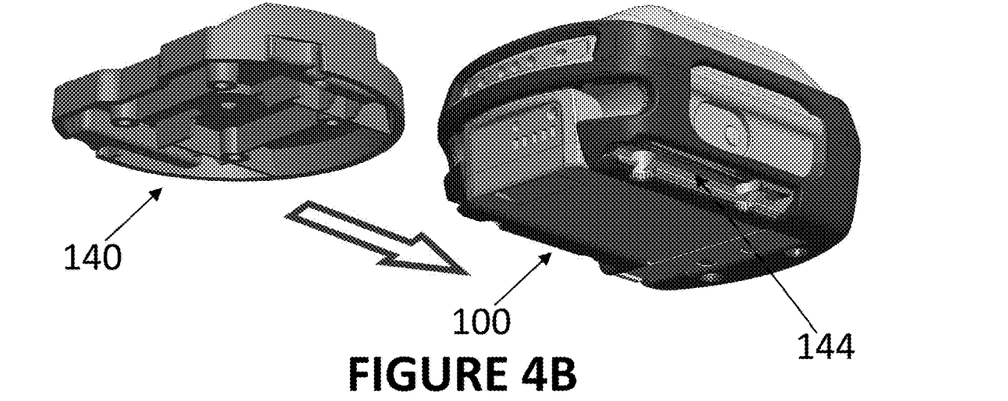

According to an embodiment, and as shown in FIGS. 4A-4B the GNSS receiver 100 can be installed on a pole-mount adapter 140 (or bracket), which cooperates and mechanically couples with an external portion of the housing 101 of the GNSS receiver 100. For example, and without limitation, it can comprise a rail 141 of the pole-mount adapter 140 which engages with a corresponding pair of linear recesses 144 on the sides of the housing 101 of the GNSS receiver 100, and can include additional features such as a spring-biased pin or a similar element which engages with a corresponding bore on the opposite part to lock the housing 101 and the pole-mount adapter 140 together.

Figure 5A:
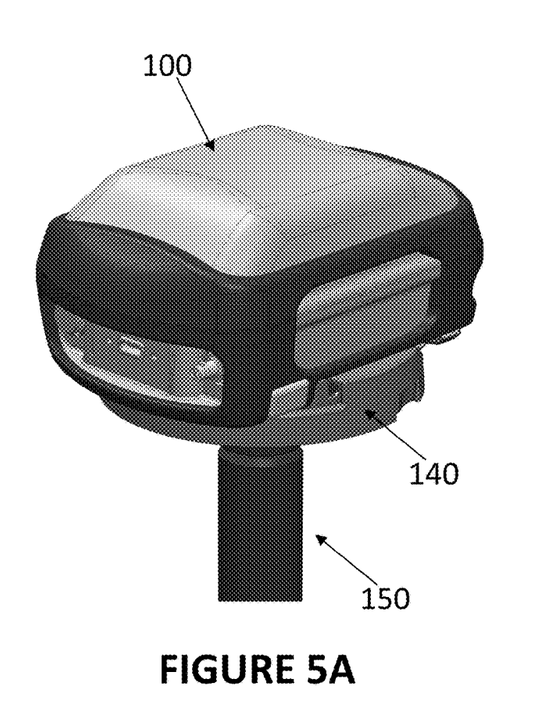
FIGS. 5A-5B depict a GNSS receiver which is mounted on a pole using the pole-mount adapter as in FIGS. 5A-5B, in accordance with the embodiments of the present disclosure.
Figure 5B:
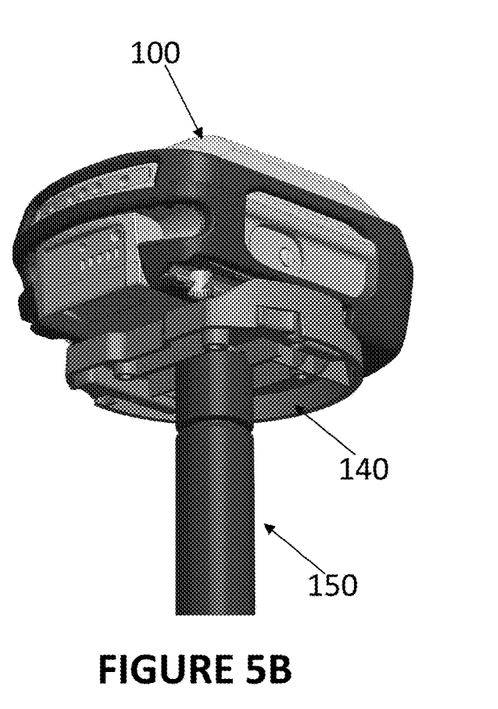

According to an embodiment, the pole-mount adapter 140 can be used in combination with other elements for the purpose of mounting the GNSS receiver 100 on such an element, for example a pole 150, using a pin or screw of the pole 150 inserted into a bore of the pole-mount adapter 140. As shown in FIGS. 5A-5B, the pole 150 can be adapted to cooperate and lock with the pole-mount adapter 140, thereby mounting and securing the GNSS receiver 100 onto the pole 150 using the pole-mount adapter 140 in-between to secure them together in a pole-mounted configuration. Also, the upper portion of the pole in FIGS. 5A-5B may in fact belong to the pole-mount adapter 140 shown in FIGS. 4A-4B.

Figure 6A:
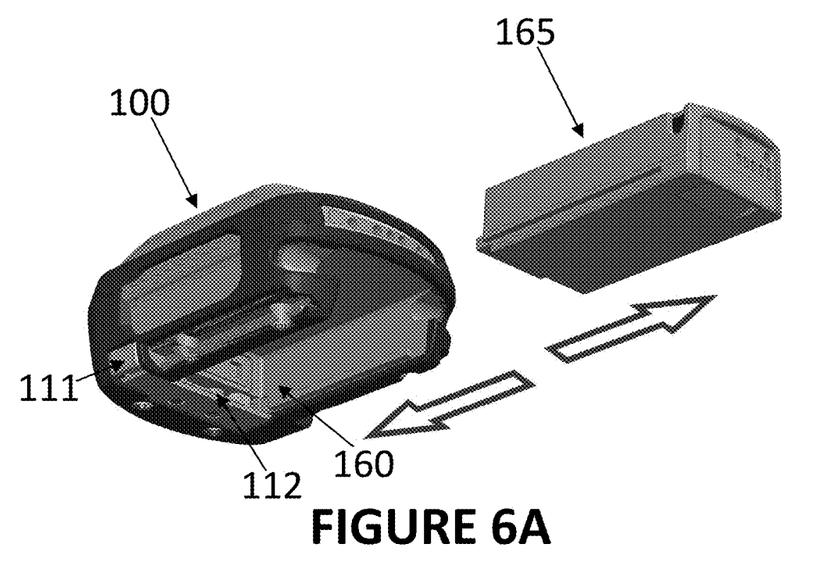
FIGS. 6A-6B depict a GNSS receiver comprising a removable battery, in accordance with the embodiments of the present disclosure.
Figure 6B:
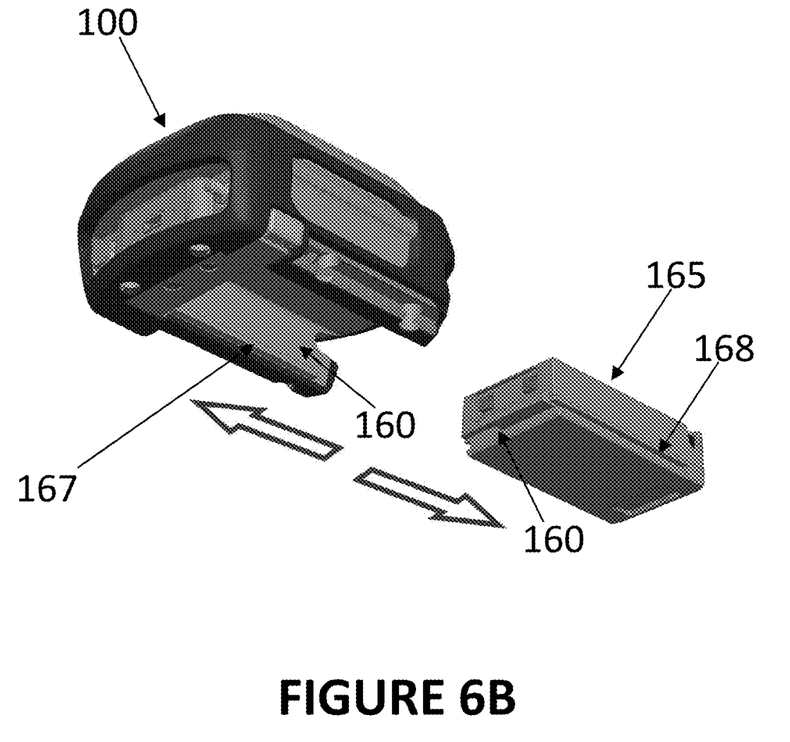
Figures 7A, 7B:
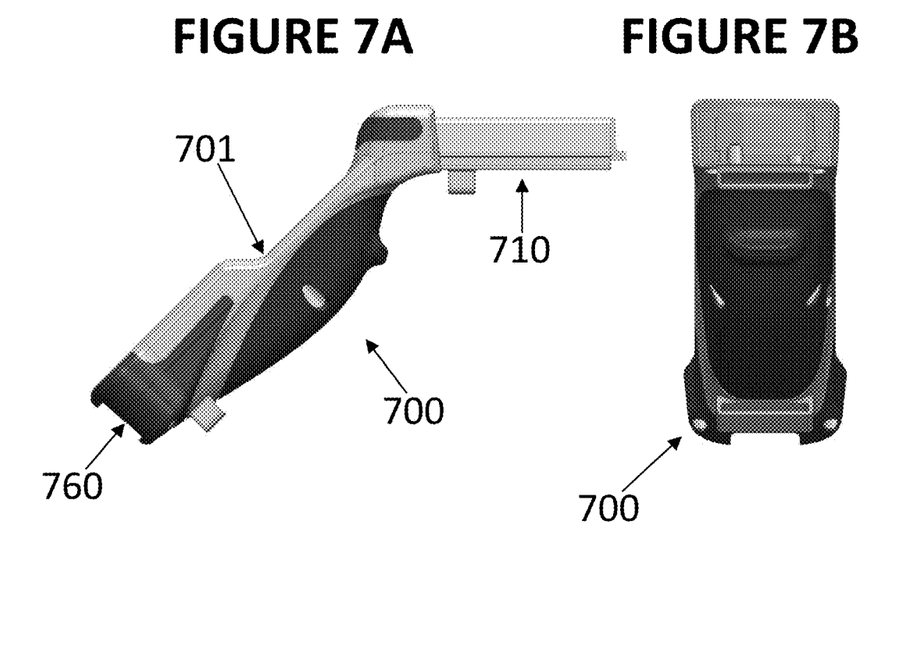
FIGS. 7A-7D depict a handle for use with a GNSS receiver, in accordance with the embodiments of the present disclosure.
Figure 7C:
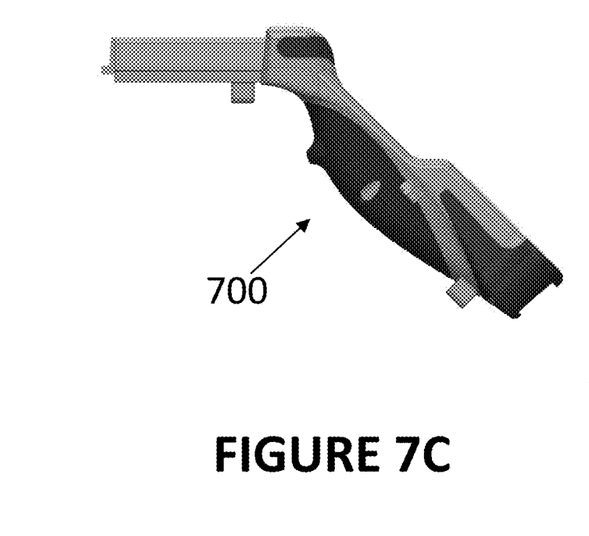
Figure 7D:
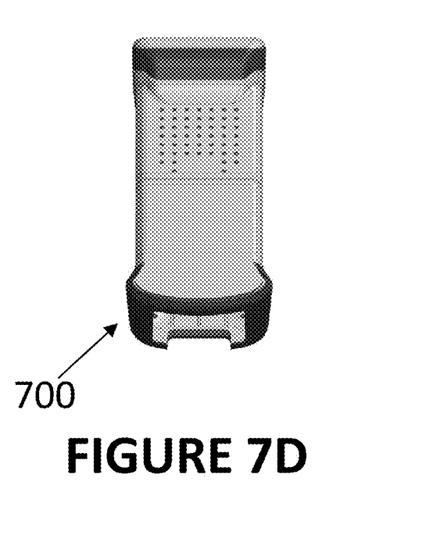

According to an embodiment of the disclosure, and referring to FIGS. 6A-6B, there is provided, in the housing 101, a battery receptacle 160 for receiving a battery 165 (namely the GNSS receiver battery receptacle 160). For example, the battery receptacle 160 and the battery 165 may comprise corresponding elements which cooperate or interlock together such that the battery 165 may fit (e.g., slide into) and be retained to remain in the battery receptacle 160. For example, and without limitation, it can comprise a rail 167 of the sides of the housing 101 of the GNSS receiver 100 which engages with a corresponding pair of linear recesses 168 on the battery 165, or vice versa (the rail and linear recesses can be provided on opposite elements as long as all is consistent in the complete system), and can include additional features such as a spring-biased pin or retaining pin 111 or a similar element which engages with a corresponding bore on the opposite part to lock the battery receptacle 160 of the housing 101 and the battery 165 together, or which may simply align a corresponding part 112 of said retaining pin 111 with a corresponding hooking portion 161 of the battery 160, as shown in FIGS. 6A-6B.

Now referring to FIGS. 7A-7D, there is shown a handle, or handheld receptacle 700, adapted for use with a GNSS receiver 100, in accordance with an embodiment of the disclosure. The handheld receptacle 700 should comprise a handling portion 701 which is shaped to be grabbed and manipulated by a hand, for example.

Figure 8A:
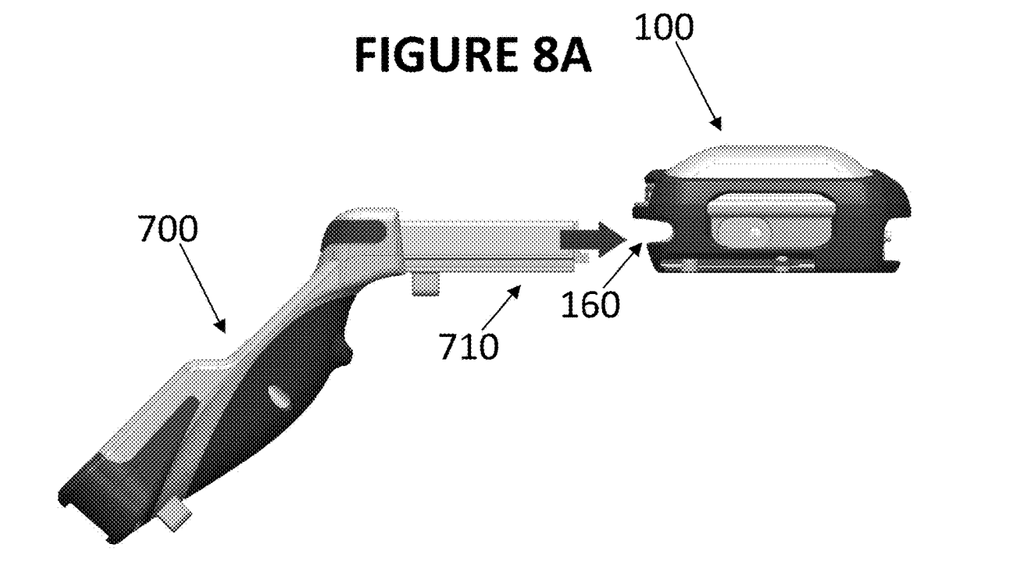
FIGS. 8A-8B depict a GNSS receiver and a handle for use with the GNSS receiver, wherein the handle is shown to be insertable in the battery housing portion of the GNSS receiver with the battery reinserted in the handle, in accordance with the embodiments of the present disclosure.
Figure 8B:
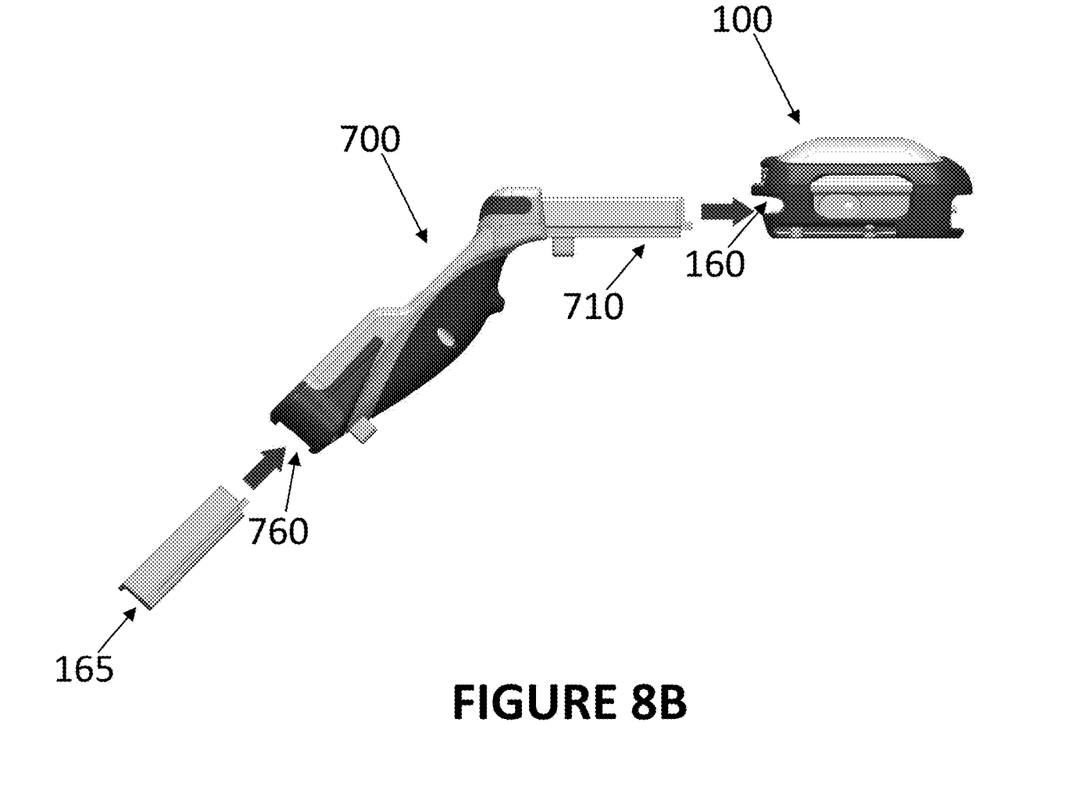
Figures 9A, 9B:
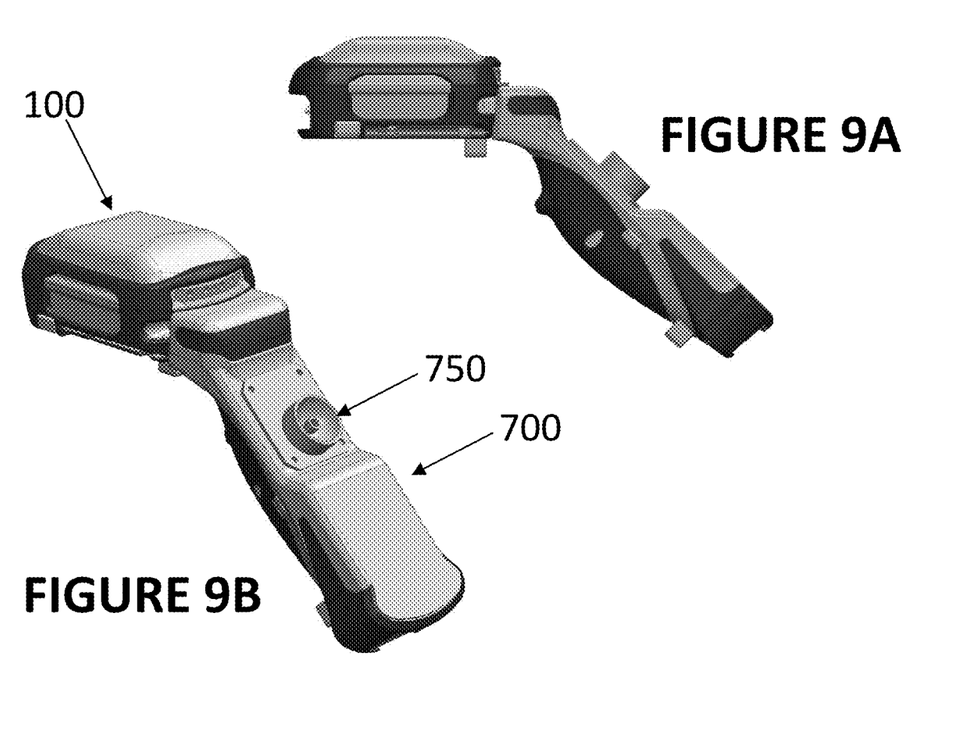
FIGS. 9A-9D depict a GNSS receiver and a handle for use with the GNSS receiver, wherein the handle is inserted in the battery housing portion of the GNSS receiver with the battery reinserted in the handle, in accordance with the embodiments of the present disclosure.
Figures 9C, 9D:
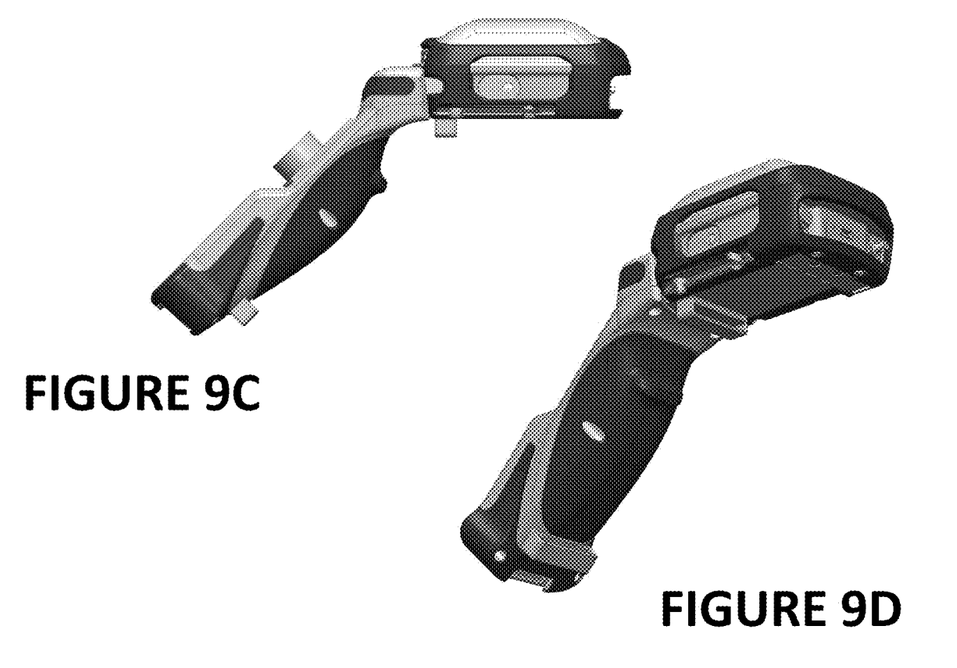

According to an embodiment, and as shown in FIGS. 8A-8B, the handheld receptacle comprises an insertion portion 710 which is adapted to be inserted into the battery receptacle 160 of the housing 101, when no battery 165 is housed in the battery receptacle 160. For example, and without limitation, the distal portion of the handheld receptacle 700 forms the insertion portion 710 having an external shape similar to the external shape of the battery 165 (i.e., it is shaped as an outer portion thereof) which is normally inserted into the battery receptacle 160 of the housing 101. This ensures that the battery receptacle 160 of the housing 101 can receive therein either the battery 165 or the insertion portion 710 of the handheld receptacle 700, interchangeably. A hooking portion 711 can be provided to be hooked by the retaining pin 111 of the GNSS receiver when the insertion portion 710 of the handheld receptacle 700 is inserted and housed therein.

Accordingly, just like with the battery 165, the insertion portion 710 of the handheld receptacle 700 may comprise corresponding elements which cooperate or interlock with the battery receptacle 160 such that the insertion portion 710 may fit (e.g., slide into) and be retained to remain in the battery receptacle 160. For example, and without limitation, it can comprise a rail 717 of the insertion portion 710 which engages with a corresponding pair of linear recesses 168 on the sides of the housing 101 of the GNSS receiver 100, or vice versa, and can include additional features such as a spring-biased pin or a similar element which engages with a corresponding bore on the opposite part to lock the battery receptacle 160 of the housing 101 and the battery 165 together.

In this case, since the battery 165 is removed from the GNSS receiver 100, the handheld receptacle 700 should also comprise a battery, as well as the electric circuit which feeds the electrical power from said battery from within the handheld receptacle 700 to the appropriate connectors in the battery receptacle 160 of the GNSS receiver 100. Advantageously, and as shown in FIG. 8B, it would be the same battery 165, removed from the GNSS receiver 100 and then reinserted into the other distal end, e.g., the bottom, of the handheld receptacle 700, in a battery receptacle 760 of the handheld receptacle 700 (namely the handle battery receptacle) similar to the battery receptacle 160 of the GNSS receiver 100.

Accordingly, just like with the battery receptacle 160, the battery receptacle 760 (or battery housing) of the handheld receptacle 700 and the battery 165 may comprise corresponding elements which cooperate or interlock together such that the battery 165 may fit (e.g., slide into) and be retained to remain in the battery receptacle 760 of the handle 160. For example, and without limitation, it can comprise a pair of linear recesses 168 of the battery 165 which engages with a corresponding rail 767 on the sides of the battery receptacle 760, or vice versa, and can include additional features such as a retaining pin 761 or a similar element which engages with a corresponding bore on the opposite part to lock the battery receptacle 760 of the handheld receptacle 700 and the battery 165 (with its hooking portion 162) together.

Formally, this can be described as follows. According to an embodiment of the disclosure, the GNSS receiver battery receptacle 160 comprises a first rail and the insertion portion 710 of the handheld receptacle 700 comprises a first linear recess corresponding to the first rail for slidably receiving the insertion portion 710 of the handheld receptacle 700 in the GNSS receiver battery receptacle 160. The handheld receptacle battery receptacle 760 comprises a second rail and the battery 165 comprises a second linear recess corresponding to the second rail for slidably receiving the battery 165 in the handheld receptacle battery receptacle 760. The second rail of the handheld receptacle battery receptacle is identical to the first rail of the GNSS receiver battery receptacle, and the second linear recess of the battery 165 corresponds to both the first rail and the second rail for alternately slidably receiving the battery 165 in the handheld receptacle battery receptacle 760 or in the GNSS receiver battery receptacle 160. It follows that the first and second linear recesses should also be identical.

Alternatively, that is according to an alternative embodiment of the disclosure the GNSS receiver battery receptacle 160 comprises a first linear recess and the insertion portion 710 of the handheld receptacle 700 comprises a first rail corresponding to the first linear recess for slidably receiving the insertion portion 710 of the handheld receptacle 700 in the GNSS receiver battery receptacle 160. The handheld receptacle battery receptacle 760 comprises a second linear recess and the battery 165 comprises a second rail corresponding to the second linear recess for slidably receiving the battery 165 in the handheld receptacle battery receptacle 760. The second linear recess of the handheld receptacle battery receptacle 760 is identical to the first linear recess of the GNSS receiver battery receptacle 160, and the second rail of the battery 165 corresponds to both the first linear recess and the second linear recess for alternately slidably receiving the battery 165 in the handheld receptacle battery receptacle 760 or in the GNSS receiver battery receptacle 160. It follows that the first and second rails should also be identical.

In order to be able to provide power to the GNSS receiver 100 uninterruptedly during the removal of the battery 165, insertion of the insertion portion 710 of the handle 700 into the battery receptacle of the GNSS receiver 100, and reinsertion of the battery 165 (or another similar battery) into the battery receptacle 760 of the handle 160, there may be provided a temporary battery, or condenser or other type of energy storage to provide for a hot swapping of the battery 165 during the active operation time of the GNSS receiver 100 without losing power completely, to ensure continuity of operation during the short period of time (e.g., a few seconds) to perform the swapping of the battery from one housing to another (160, 760).

As shown in FIGS. 9A-9D, the combined GNSS receiver 100 and handheld receptacle 700 provide for an apparatus which is easy to handle and which comprises the active GNSS receiver 100. The battery 165 is being displaced in the battery receptable 760 of the handheld receptacle 700 instead of the battery receptacle 160 of the GNSS receiver 100.

Figure 10A:
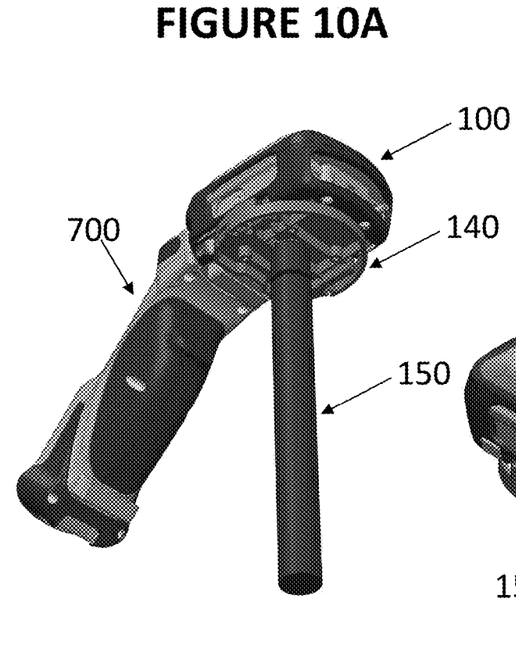
FIGS. 10A-10B depict the GNSS receiver and handle combined together as in FIGS. 9A-9D and mounted on a pole, in accordance with the embodiments of the present disclosure.
Figure 10B:
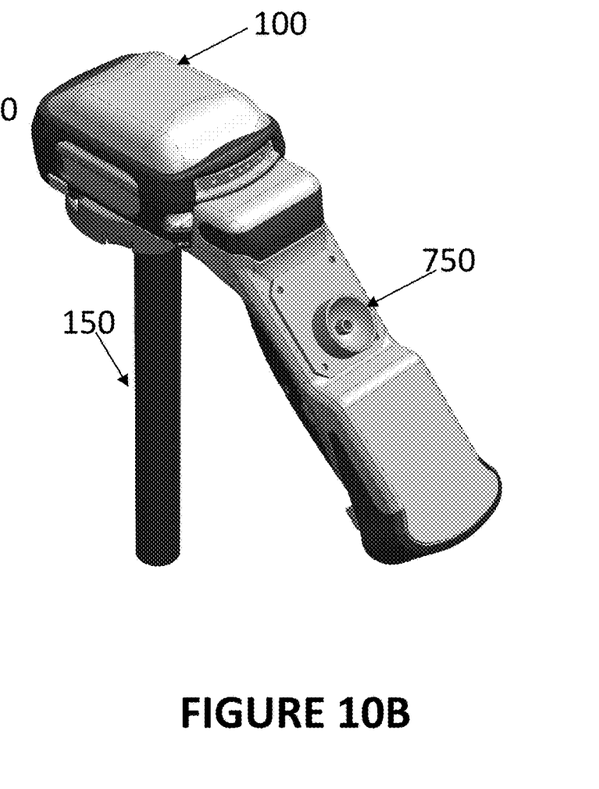

According to an embodiment of the disclosure, and as shown in FIGS. 10A-10B, the assembled or combined apparatus can be installed onto the pole 150 using the pole-mount adapter 140, which is still attachable to the GNSS receiver 100 while the insertion portion 710 is inserted into the battery receptable 160 of the housing 101 of the GNSS receiver 100.

Figure 11A:
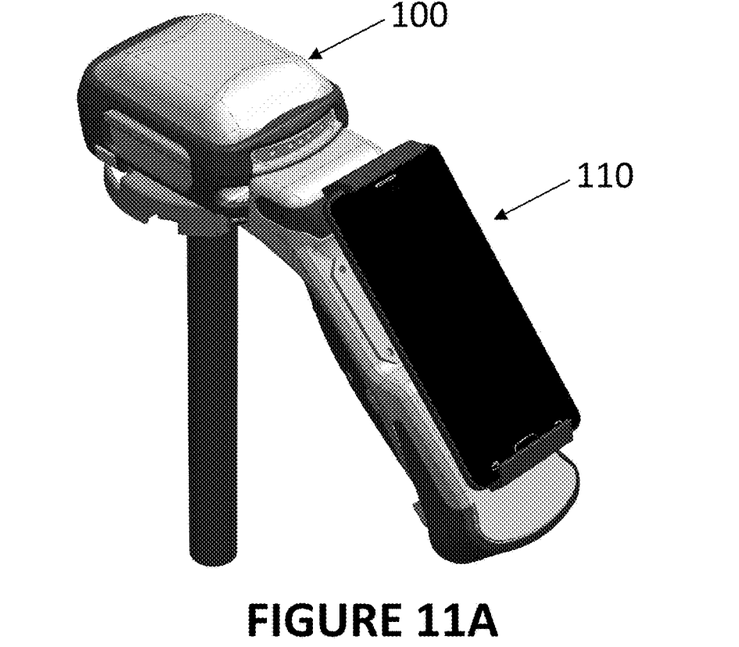
FIGS. 11A-11B depict the GNSS receiver and handle combined together as in FIGS. 9A-9D and mounted on a pole or not, with an electronic device mounted thereon on a dedicated pole-mount adapter, in accordance with the embodiments of the present disclosure.
Figure 11B:
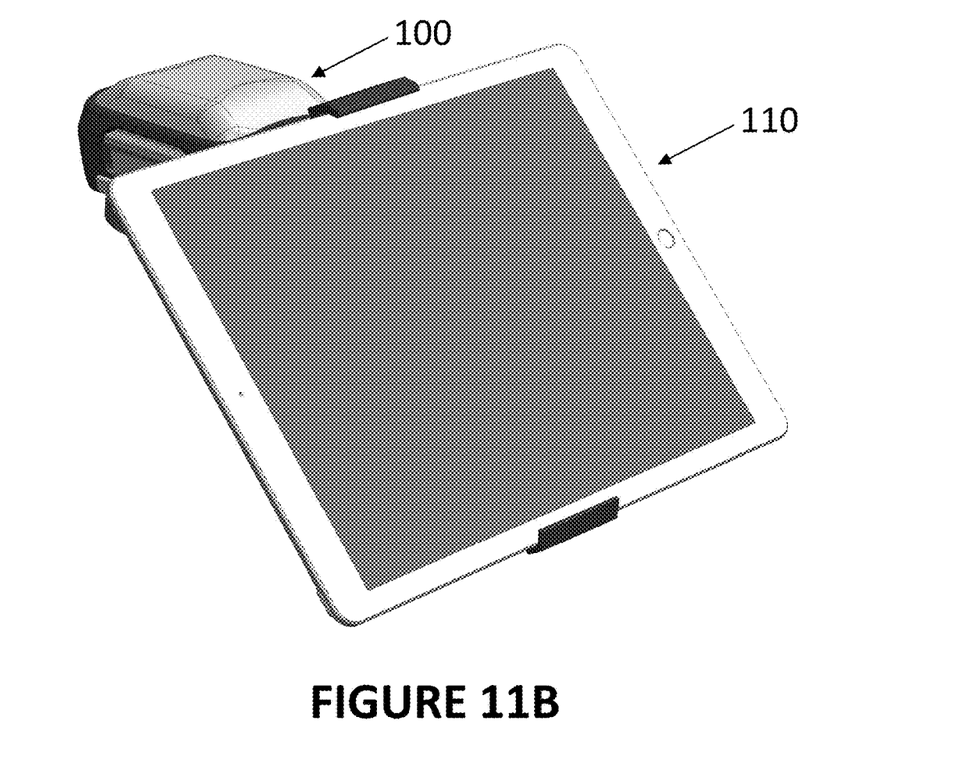

According to an embodiment of the disclosure, and as shown in FIGS. 11A-11B, there is also provided a socket 750 which is a receptacle that receives and holds in place an external electronic device 110, such as a smartphone, a tablet computer, or other type of portable computer, etc.

Figure 12:
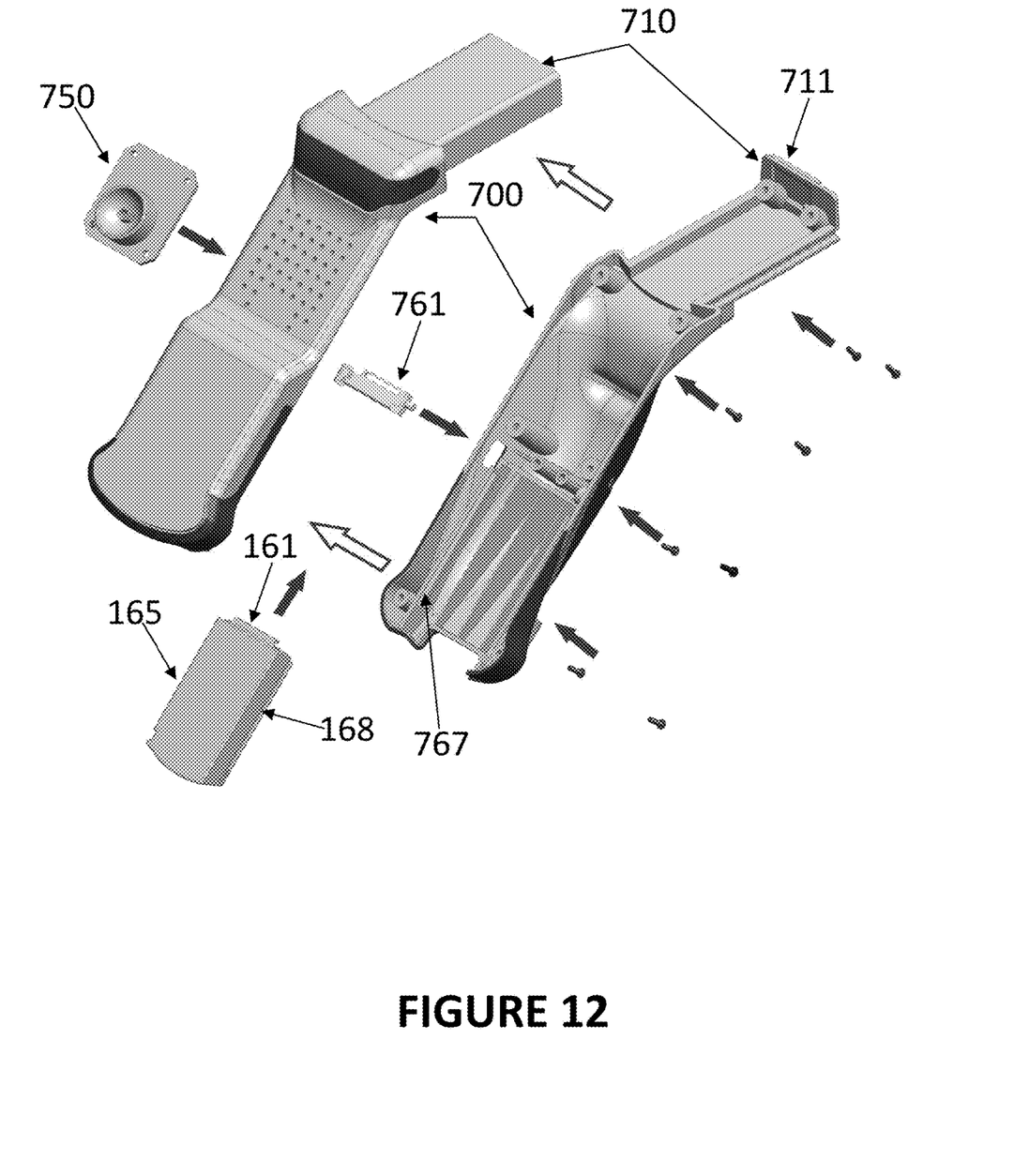
FIGS. 12 is an exploded view illustrating the handle for use with a GNSS receiver as in FIGS. 7A-7D, in accordance with the embodiments of the present disclosure.

As shown in the exploded view of FIG. 12, the handheld receptacle 700 can be made, for example, of two cooperating portions which are assembled together, for example by screwing (assembly screws are shown). According to an embodiment, the socket 750 can be detachable and releasably secured to the surface of the handheld receptacle 700, for example by screwing or pinning it in place. The socket 750 for mounting and securing the external electronic device 110 (smartphone, tablet, etc.) is located on the handheld receptacle 700, and according to an embodiment, it is located between the insertion portion 710 and the battery receptable 760.

The retaining pin 761 which can be inserted, for example from the side of the handheld receptacle 700, to retain a corresponding portion of the battery 165 such that when the battery is inserted, the retaining pin 761 can be inserted afterward to retain the battery 165 in place and clip or lock with a corresponding hooking portion 161 on the battery 165. As mentioned above, a similar mechanism could be used for the GNSS receiver 100 when the battery 165 is housed therein.

According to an embodiment, the GNSS device 100 as described herein is configured to determine a geolocation, or GNSS location, by being in communication with a GNSS satellite. The GNSS receiver 100 may record the geolocation over time along with other data (such as metadata or precision data). The GNSS receiver 100 may also communicate the data to a computer such as the computing device 110 which, without limitation, can be installed on the socket 750. The computer devices 110 may be a computer, laptop, iPad or a tablet, or any other device that has a Bluetooth transceiver, an input/output periphery, a display, a computer device processor and a memory. The computer device 110 is configured to receive the data in Bluetooth protocol from the GNSS receiver 100, store it in the computer memory and retrieve it for display, for transfer, or for a user query when requested.

The system described herein can be used advantageously to add a handheld receptacle 700 to a GNSS receiver 100 which is made to be used without any handle if no handle is present, or if not useful or better without any, providing greater versatility and adaptability. Also, the ability to change the location of the battery enable a much deeper and more solid insertion of the handle inside the GNSS receiver 100, and the inclusion of the battery 165 at the other end of the handheld receptacle 700 gives a weight distribution which is more agreeable when the combined apparatus is manipulated for operation. Also, the hot-swap capability of the battery ensures convenience when switching from one configuration (GNSS receiver in standalone configuration) to the other configuration (combined configuration of the GNSS receiver 100 and handle inserted therein).

Regarding the weight distribution, including the battery 165 at the other end of the handheld receptacle 700 changes the center of mass of the whole apparatus by displacing it away from an eventual GNSS receiver 100 to be installed thereon. This implies that when the GNSS receiver 100 is installed, having the relatively heavy battery relocated in the end of the handheld receptacle 700 away from the GNSS receiver 100 (also relatively heavy) makes a more balanced apparatus, i.e., the battery's weight compensates (at least partly) the weight of the GNSS receiver 100 on either side of the handle and the user's end, thus making the apparatus balanced on either side of the handle portion of the handheld apparatus and ensuring that the total (net) moment of force relative to a central portion of the handle portion is reduced. This puts less stress on the user's wrist who does not need to force as much to maintain the apparatus balanced thanks to the battery's weight pulling down on the other side of the handle portion. This can be compared to a prior-art setting in which the user would need to force at the wrist to compensate for the weight of the GNSS receiver 100, with the battery being on the same side as the electronic device and thereby not compensating and rather increasing the moment of force exerted onto the user's wrist. The socket 750 located approximately at a center of the handheld receptacle 700 and which receives a weight of the external electronic device 110 also contributes to maintain the overall weight relatively centered close to the hand of the user to avoid unbalance restively to said center and thereby reduce wrist fatigue.

Finally, this configuration can also be used to switch to a pole-mounted configuration easily, and this switch can be done with either the battery of the handle being housed in the battery receptacle 160 of the GNSS receiver 100, because they have the same shape and can both accommodate the pole-mount adapter 140 for easy connection onto the pole 150.

Using the handle 700 with its socket 750 is also very useful for easy installation of an associated computing device 110 which can be used for input and output of data by being in communication (wired, Bluetooth™, etc.) with the GNSS receiver 100.

While preferred embodiments have been described above and illustrated in the accompanying drawings, it will be evident to those skilled in the art that modifications may be made without departing from this disclosure. Such modifications are considered as possible variants comprised in the scope of the disclosure.

The invention claimed is:

1. A system comprising:
a global navigation satellite system (GNSS) receiver comprising a GNSS receiver battery receptacle for housing a battery therein; and
a handheld receptacle which has an insertion portion which is shaped as an outer portion of the battery and which is adapted for insertion into the battery receptacle of the GNSS receiver instead of the battery, wherein the handheld receptacle comprises a handheld receptacle battery receptacle to receive the battery therein.

2. The system of claim 1, wherein the handheld receptacle further comprises a socket for installing and securing an associated computing device thereon, the computing device being in communication with the GNSS receiver.

3. The system of claim 2, wherein the socket is removably attached to the handheld receptacle.

4. The system of claim 3, wherein the socket is centrally located between the insertion portion and handheld receptacle battery receptacle such that a weight of the computing device is applied centrally on said handheld receptacle.

5. The system of claim 1, wherein the handheld receptacle comprises an electric circuit therein to provide power from the battery installed in the handheld receptacle battery receptacle to the GNSS receiver battery receptacle through the insertion portion of the handheld receptacle.

6. The system of claim 1, further comprising a pole-mount adapter for connecting the GNSS receiver onto a pole 150, wherein the pole-mount adapter is immediately below the GNSS receiver battery receptacle and the battery and the insertion portion of the handheld receptacle can be interchanged from the GNSS receiver while leaving the pole-mount adapter in place.

7. The system of claim 1, wherein the GNSS receiver battery receptacle comprises a first rail and the insertion portion of the handheld receptacle comprises a first linear recess corresponding to the first rail for slidably receiving the insertion portion of the handheld receptacle in the GNSS receiver battery receptacle.

8. The system of claim 7, wherein the handheld receptacle battery receptacle comprises a second rail and the battery comprises a second linear recess corresponding to the second rail for slidably receiving the battery in the handheld receptacle battery receptacle.

9. The system of claim 8, wherein the second rail of the handheld receptacle battery receptacle is identical to the first rail of the GNSS receiver battery receptacle, and the second linear recess of the battery corresponds to both the first rail and the second rail for alternately slidably receiving the battery in the handheld receptacle battery receptacle or in the GNSS receiver battery receptacle.

10. The system of claim 1, wherein the GNSS receiver battery receptacle comprises a first linear recess and the insertion portion of the handheld receptacle comprises a first rail corresponding to the first linear recess for slidably receiving the insertion portion of the handheld receptacle in the GNSS receiver battery receptacle.

11. The system of claim 10, wherein the handheld receptacle battery receptacle comprises a second linear recess and the battery comprises a second rail corresponding to the second linear recess for slidably receiving the battery in the handheld receptacle battery receptacle.

12. The system of claim 11, wherein the second linear recess of the handheld receptacle battery receptacle is identical to the first linear recess of the GNSS receiver battery receptacle, and the second rail of the battery corresponds to both the first linear recess and the second linear recess for alternately slidably receiving the battery in the handheld receptacle battery receptacle or in the GNSS receiver battery receptacle.

13. The system of claim 9, further comprising a retaining pin in the GNSS receiver battery receptacle that retains either the battery or the insertion portion of the handheld receptacle in place in the GNSS receiver battery receptacle.

14. The system of claim 13, further comprising a retaining pin in the handheld receptacle battery receptacle that retains the battery in place in the handheld receptacle battery receptacle.

15. The system of claim 1, wherein the GNSS receiver is a Global Positioning System (GPS) receiver.

16. The system of claim 12, further comprising a retaining pin in the GNSS receiver battery receptacle that retains either the battery or the insertion portion of the handheld receptacle in place in the GNSS receiver battery receptacle.

* * * * *